3,157,569
METHOD OF CONTROLLING INSECTS WITH
CYANIDE HYDRAZONES
Roger W. Addor and Donald P. Wright, Jr., Pennington,
N.J., assignors to American Cyanamid Company, Stamford, Conn., a corporation of Maine
No Drawing. Filed Nov. 8, 1962, Ser. No. 236,443
7 Claims. (Cl. 167—30)

The present invention relates to pesticidal compositions and particularly to insecticidal compositions. More particularly, this invention relates to insecticidal compositions comprising a major portion of a carrier and an insecticidally active compound having the formula:

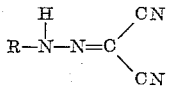

wherein R is an aryl radical having from 1 to 2 rings, i.e., phenyl or naphthyl, and substituted aryl radicals having from 1 to 2 rings, i.e., substituted phenyl or substituted naphthyl.

While R in the above general formula may be phenyl or naphthyl and substituted phenyl or naphthyl broadly, preferably R is phenyl, halophenyl and in particular mono and dihalophenyl, lower alkoxyphenyl, where the alkyl group contains from 1 to 4 carbon atoms, such as methyl, ethyl, propyl, isopropyl, butyl and naphthyl.

As examples of carbonyl cyanide hydrozones contemplated for use in accordance with this invention, the following are illustrative: carbonyl cyanide phenyl hydrazone, carbonyl cyanide p-chlorophenyl hydrazone, carbonyl cyanide m-chlorophenyl hydrazone, carbonyl cyanide 2,5-dichlorophenyl hydrazone, carbonyl cyanide p-methoxyphenyl hydrazone, carbonyl cyanide o-methoxyphenyl hydrazone, carbonyl cyanide m-methoxyphenyl hydrazone, carbonyl cyanide m-ethoxyphenyl hydrazone, carbonyl cyanide m-isopropoxyphenyl hydrazone, carbonyl cyanide α-naphthyl hydrazone, carbonyl cyanide β-naphthyl hydrazone and carbonyl cyanide 4-methylnaphthyl hydrazone.

The general procedure employed to prepare carbonyl cyanide hydrazones of this invention is that disclosed by Hantzsch and Thompson, Ber. 38, 2266 (1905), and by Lythgoe, Todd and Topham, J. Chem. Soc. 315 (1944). In accordance with teachings of these texts, a suitable aniline is dissolved in three or more equivalents of hydrochloric acid, illustratively as a 15% solution, and is diazotized by the addition of an equivalent of sodium nitrite. The diazonium salt solution is then added to a cooled mixture of an equivalent of malononitrile in an ethanol-water mixture to which three equivalents of sodium acetate has been added. The solid products are collected, water washed, vacuum dried, and recrystallized from suitable solvents. It will be appreciated that in the preparation of the various carbonyl cyanide hydrazones, as the number of equivalents of acid increases, larger amounts of sodium acetate are employed in the condensation step.

The analytical data for a number of typical carbonyl cyanide hydrazones contemplated for use in this invention and prepared employing the general procedure above are set forth in Table I below.

TABLE I
Analytical Data for Some Nitrile-Containing Hydrazones and Related Compounds

| Compound 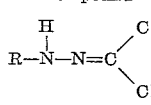 | Melting Point a | Calculated | | | Found | | |
|---|---|---|---|---|---|---|---|
| R= | | C | H | N | C | H | N |
| A. phenyl | 145–147° (dec.) | | | | 52.9 | 2.6 | |
| B. p-chlorophenyl | 189 (dec.) | 52.8 | 2.5 | | 52.9 | 2.6 | |
| C. m-chlorophenyl | 165.4–166.0 | 52.8 | 2.5 | 27.4 | 53.1 | 2.6 | 27.2 |
| D. 2,5-dichlorophenyl | 157.0–157.5 | 45.2 | 1.7 | 23.4 | 45.0 | 2.0 | 22.7 23.0 |
| E. p-methoxyphenyl | 150 (dec.) | 60.0 | 4.0 | 28.0 | 59.8 | 4.2 | 28.2 |
| F. o-methoxyphenyl | 117.4–118.4 | 60.0 | 4.0 | 28.0 | 59.9 | 4.0 | 28.2 |
| G. m-methoxyphenyl | 146+ (dec.) | 60.0 | 4.0 | 28.0 | 59.9 | 3.9 | 27.8 |
| H. α-naphthyl | | 70.9 | 3.7 | 25.4 | 71.3 | 3.7 | 25.5 | a Melting point is that of analytically pure material.

The insecticidal compositions of this invention may be employed where insecticidal activity is achieved by contact action.

These compositions comprise a major portion (more than 50° by weight) of a carrier and a minor portion of the carbonyl cyanide hydrazones described above. These compositions may be used as sprays in which the carrier is a suitable organic solvent such as ketones, e.g., acetone, cyclohexanone, methylethyl ketone and the like. In addition, as sprays they may be employed with lower monohydric aliphatic alcohols, ketone alcohols such as diacetone alcohol, various esters and aromatic hydrocarbons. The insecticidal compositions may be in the form of emulsions, either water or other non-solvents, or on solid carriers such as talcs, clays such as kaolin, fuller's earth, chalk, wood flour, silica, activated carbon, whether derived from wood sources, such as charcoal or petroleum coke, or other inert powders. The carbonyl cyanide hydrazones may be employed on such carriers in amounts of from between 0.5% to 5% of the total composition and applied as dusts.

The insecticidal compositions of this invention may be applied to the pest or insect, the term applied being intended to include application to their habitat, or to organic matter such as plant life, which forms the feed of the pest or insect.

In order to illustrate the present invention, the following examples are given primarily by way of illustration. No specific details or enumerations contained therein should be construed as limitations on the present invention except insofar as they appear in the appended claims.

Example 1

INSECTICIDAL ACTIVITY AGAINST NASTURTIUM APHIDS (*APHIS RUMICIS* L.)

The carbonyl cyanide hydrazones to be tested are made up as 0.1% solutions in 65% acetone-35% water. Three-inch pots containing a nasturtium plant two inches tall and infested two days before are selected for testing. The pots are placed on a turntable (4 r.p.m.) and sprayed for two revolutions with a #154 De Vilbiss Atomizer at 20 p.s.i. air pressure. The spray tip is held about six inches from the plant and the spray is directed so as to give complete coverage of the aphids and the plant. The sprayed plants are laid on their sides on white enamel trays. Mortality estimates are made after holding for two days at 70° F., 50% relative humidity and the compounds showing kills greater than 75% are further tested at ten-fold dilutions in 65% acetone-35% water solutions.

Carbonyl cyanide phenyl hydrazones, carbonyl cyanide 2,5-dichlorophenyl hydrazone and carbonyl cyanide o-methoxyphenyl hydrazone all demonstrated greater than a 50% kill when applied as a 0.1% solution. Carbonyl cyanide 2,5-dichlorophenyl hydrazone demonstrated a 100% kill as a 0.01% solution.

*Example 2*

INSECTICIDAL ACTIVITY AGAINST THE SOUTHERN ARMYWORM (*PRODENIA ERIDANIA* CRAM.)

The carbonyl cyanide hydrazones to be tested are made up as a 0.1% solution as described in Example 1. Sieva Lima bean leaves are dipped in the test solution and set into the hood to dry. When dry, they are placed in four-inch petri dishes which have a moist filter paper in the bottom and ten third-instar armyworm larvae about ⅜ inch long are added to each dish. The dishes are covered and held at 80° F., 60% relative humidity, for two days. After two days mortality counts and estimates of the amount of feeding are made.

Carbonyl cyanide phenyl hydrazone, carbonyl cyanide p-chlorophenyl hydrazone, carbonyl cyanide m-chlorophenyl hydrazone, carbonyl cyanide 2,5-dichlorophenyl hydrazone and carbonyl cyanide α-naphthyl hydrazone all demonstrated 100% kill when applied as a 0.1% solution. Carbonyl cyanide o-methoxyphenyl hydrazone and carbonyl cyanide m-methoxyphenyl hydrazone demonstrated 50% and 60% kill respectively at the same concentration.

*Example 3*

INSECTICIDAL ACTIVITY AGAINST LARGE MILKWEED BUG (*ONCOPELTUS FASCIATUS* DALL.)

The compounds to be tested were made up as a 1% dust by mixing 0.1 gram of the carbonyl cyanide with 9.9 grams of Pyrax ABB talc, wetting with 5 ml. of acetone and grinding in a mortar and pestle until dry. 25 mg. of the 1% dust is sprinkled evenly over the bottom of a 7-inch crystalizing dish using a screen-bottom plastic cup about ⅝ inch in diameter as an applicator. Twenty adult bugs are added and a screen cover put on the dish. Water is supplied in 2 ounce bottles with a cotton wick. Mortality counts are made after holding for three days at 80° F. and 60% relative humidity.

Carbonyl cyanide phenyl hydrazone, carbonyl cyanide p-chlorophenyl hydrazone, carbonyl cyanide m-chlorophenyl hydrazone, carbonyl cyanide 2,5-dichlorophenyl hydrazone and carbonyl cyanide p-methoxyphenyl hydrazone demonstrated activity against the large milkweed bug.

*Example 4*

INSECTICIDAL ACTIVITY AGAINST THE GERMAN COCKROACH (*BLATELLA GERMANICA* L.)

The procedure as employed above against the large milkweed bug is employed here. However, only adult males are used in the test. At the 1% level, carbonyl cyanide phenyl hydrazone, carbonyl cyanide p-chlorophenyl hydrazone, carbonyl cyanide m-chlorophenyl hydrazone and carbonyl cyanide p-methoxyphenyl hydrazone all demonstrated activity against the German cockroach.

*Example 5*

INSECTICIDAL ACTIVITY AGAINST THE TWO-SPOTTED SPIDER MITE (*TETRANYCHUS TELARIUS* L.)

The carbonyl cyanide hydrazones to be tested are made up as 0.1% solutions in 65% acetone-35% water. Sieva Lima bean plants with their first pair of leaves three to four inches in size are infested about five hours before testing using about 100 to 200 adult mites per leaf. The infested leaves are dipped in the test solutions (in four-inch crystallizing dishes) for three seconds and the plants set in the hood to dry. The treated plants are held for two days at 80° F. and at 60% relative humidity and the adult mite mortality calculated by counting dead and alive adults on one leaf under a 10× binocularscope. The other leaf is held an additional five days and then is examined at 10× power to estimate the kill of eggs and newly-hatched nymphs, giving a measure of the ovocidal and residual action, respectively. Compounds showing kills greater than 85% are further tested at ten-fold dilutions in 65% acetone-35% water solutions.

The results of this test are repored in Table II below.

TABLE II

| Insecticide | Mites | | |
|---|---|---|---|
| | 0.1% | 0.01% | 0.001% |
| Carbonyl cyanide phenyl hydrazone | 56 | | |
| Carbonyl cyanide p-chlorophenyl hydrazone | 100 | 100 | 0 |
| Carbonyl cyanide m-chlorophenyl hydrazone | 100 | 33 | |
| Carbonyl cyanide 2,5-dichlorophenyl hydrazone | 100 | 10 | |
| Carbonyl cyanide o-methoxyphenyl hydrazone | ¹100 | 0 | |
| Carbonyl cyanide α-naphthyl hydrazone | ¹100 | ¹100 | ¹100 |

¹ Dead or moribund.

We claim:

1. The method of controlling insect pests which comprises applying thereto in an insecticidally effective amount a compound of the formula:

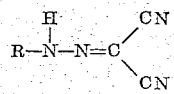

$$R-N(H)-N=C(CN)_2$$

where R is selected from the group consisting of phenyl, halo-substituted phenyl, lower alkoxyphenyl and naphthyl.

2. The method of controlling insect pests which comprises applying thereto in an insecticidally effective amount carbonyl cyanide 2,5-dichlorophenyl hydrazone.

3. A method of controlling insect pests which comprises applying thereto in an insecticidally effective amount carbonyl cyanide phenyl hydrazone.

4. A method of controlling insect pests which comprises applying thereto in an insecticidally effective amount carbonyl cyanide p-chlorophenyl hydrazone.

5. A method of controlling insect pests which comprises applying thereto in an insecticidally effective amount carbonyl cyanide m-chlorophenyl hydrazone.

6. A method of controlling insect pests which comprises applying thereto in an insecticidally effective amount carbonyl cyanide o-methoxyphenyl hydrazone.

7. A method of controlling insect pests which comprises applying thereto in an insecticidally effective amount carbonyl cyanide α-naphthyl hydrazone.

References Cited in the file of this patent

UNITED STATES PATENTS

| 2,189,197 | Santmyer et al. | Jan. 7, 1958 |
| 2,909,556 | Heininger | Oct. 20, 1959 |
| 3,062,635 | Acker et al. | Nov. 6, 1962 |